United States Patent
Mourad et al.

(10) Patent No.: US 12,156,282 B2
(45) Date of Patent: Nov. 26, 2024

(54) WIRELESS COMMUNICATION DEVICE, METHOD AND COMPUTER PROGRAM FOR A WIRELESS COMMUNICATION DEVICE

(71) Applicant: Bayerische Motoren Werke Aktiengesellschaft, Munich (DE)

(72) Inventors: Alaa Mourad, Munich (DE); Alexander Maier, Langenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/597,808

(22) PCT Filed: Jun. 24, 2020

(86) PCT No.: PCT/EP2020/067573
§ 371 (c)(1),
(2) Date: Jan. 25, 2022

(87) PCT Pub. No.: WO2021/058148
PCT Pub. Date: Apr. 1, 2021

(65) Prior Publication Data
US 2022/0264279 A1    Aug. 18, 2022

(30) Foreign Application Priority Data
Sep. 23, 2019   (EP) ..................... 19198877

(51) Int. Cl.
*H04W 4/80* (2018.01)
*H04W 4/40* (2018.01)
(Continued)

(52) U.S. Cl.
CPC ............ *H04W 8/005* (2013.01); *H04W 4/40* (2018.02); *H04W 4/80* (2018.02); *H04W 76/10* (2018.02); *H04W 84/18* (2013.01)

(58) Field of Classification Search
CPC ......... H04W 8/005; H04W 4/80; H04W 4/40; H04W 76/10; H04W 84/18
(Continued)

(56) References Cited

U.S. PATENT DOCUMENTS 9,914,415 B2 *   3/2018  Buttolo .................. B60R 16/03
10,131,319 B2 * 11/2018  Honkanen .......... G07C 9/00182
(Continued)

FOREIGN PATENT DOCUMENTS

WO    WO-2018005182 A1 *  1/2018  .............. G01S 11/06

*Primary Examiner* — April G Gonzales
(74) *Attorney, Agent, or Firm* — Kieran O'Leary; 2SPL Patent Attorneys PartG mbB (57) ABSTRACT

Examples relate to a wireless communication device for a vehicle, to a method and a computer program for a wireless communication device and to a vehicle comprising a wireless communication device. The wireless communication device comprises a transceiver module for communicating with a further wireless communication device. The wireless communication device comprises a control module configured to scan one or more wireless communication channels for advertisement packets. The wireless communication device is configured to receive an advertisement packet from the further wireless communication device. The wireless communication device is configured to adjust a duty cycle of the scan for the advertisement packets for a pre-defined time interval in response to receiving the advertisement packet.

14 Claims, 2 Drawing Sheets

(51) Int. Cl.
*H04W 8/00* (2009.01)
*H04W 76/10* (2018.01)
*H04W 84/18* (2009.01)

(58) Field of Classification Search
USPC ........................................................ 455/41.2
See application file for complete search history.

(56) References Cited

U.S. PATENT DOCUMENTS

| | | | | |
|---|---|---|---|---|
| 10,827,305 | B2* | 11/2020 | Odejerte, Jr. | H04W 4/046 |
| 11,668,808 | B2* | 6/2023 | Usaj | H04N 21/4126 |
| | | | | 342/27 |
| 2015/0148989 | A1* | 5/2015 | Cooper | E05F 15/77 |
| | | | | 701/2 |
| 2015/0230285 | A1* | 8/2015 | Park | H04W 76/19 |
| | | | | 455/41.2 |
| 2015/0351084 | A1* | 12/2015 | Werb | H04W 12/08 |
| | | | | 370/329 |
| 2015/0373749 | A1* | 12/2015 | Palin | H04W 76/10 |
| | | | | 455/41.2 |
| 2016/0063786 | A1* | 3/2016 | Lewis | B60R 25/24 |
| | | | | 340/5.72 |
| 2016/0174266 | A1* | 6/2016 | Goel | H04W 4/70 |
| | | | | 455/509 |
| 2017/0026791 | A1* | 1/2017 | Weizman | H04W 4/023 |
| 2017/0201942 | A1* | 7/2017 | Mathews | H04M 1/72412 |
| 2017/0305371 | A1* | 10/2017 | Buttolo | H04W 8/005 |
| 2018/0338330 | A1* | 11/2018 | Ledvina | H04W 12/50 |
| 2019/0135229 | A1* | 5/2019 | Ledvina | H04W 64/00 |
| 2020/0314590 | A1* | 10/2020 | Odejerte, Jr. | G01S 13/878 |

* cited by examiner

WIRELESS COMMUNICATION DEVICE, METHOD AND COMPUTER PROGRAM FOR A WIRELESS COMMUNICATION DEVICE

CROSS-REFERENCE TO RELATED APPLICATIONS

This application is a 35 U.S.C. § 371 (c) national stage entry of PCT/EP2020/067573, filed on Jun. 24, 2020. That application claimed priority to European Application 19198877.3 filed on Sep. 23, 2019. The contents of the earlier filed applications are incorporated by reference herein in their entirety.

FIELD

Examples relate to a wireless communication device, to a method and a computer program for a wireless communication device and to a vehicle comprising a wireless communication device.

BACKGROUND

Wireless communication is a field of research and development. Many different standards exist to cover a broad range of applications. For example, short range communication systems, such as Near Field Communication (NFC) are used for wireless transmissions in close proximity, while other systems, such as WIMAX (Worldwide Interoperability for Microwave Access) are used to provide wireless home broadband access to a large area.

The wireless communication standard Bluetooth Low Energy (BLE) has, for example, seen a widespread use, ranging from mobile phones, wearable devices, wireless sensors to automotive applications. In the automotive domain, BLE is a promising technology for different applications (e.g., keyless car access). One purpose of using BLE is a fast discovery, which requires a large coverage area. Due to automotive requirements, the automotive BLE chips may have a lower transmission power compared to consumer electronic chips. This may lead to unbalanced link budget, which may directly affect the coverage and therefore discovery time.

There may be desire for an improved concept for the usage of wireless communication protocols in the automotive domain.

This desire is addressed by the subject-matter of the independent claims.

SUMMARY

Embodiments of the present disclosure relate to a wireless communication device for a vehicle and to a corresponding method and computer program. As discussed above, there may be an unbalanced link budged between a wireless communication device of a vehicle and a further wireless communication device of a mobile device, such as a smartphone. In effect, while the vehicle may be able to detect advertisement packets of smartphones that are still some way away, a connection request transmitted by the wireless communication device of the vehicle in response to the received advertisement packet might not be properly received by the further wireless communication device of the mobile device, as a transmission signal power used by the wireless communication device of the vehicle may be lower than a transmission signal power used by the further wireless communication device of the mobile device. After transmitting the connection request, the wireless communication device of the vehicle may assume that the connection has been established while in fact it has not been established, so the "connection" may eventually time out. At the same time, a scanning duty cycle for scanning for advertisement packets of further wireless communication devices employed by the wireless communication device of the vehicle may be low (e.g. a 10% duty cycle, or a 20% duty cycle), so that the wireless communication device may fail to receive some of the subsequent advertisement packets transmitted by the wireless communication device as the mobile device approaches the vehicle. Thus, the mobile device may approach the vehicle without there having been a successful connection establishment between the wireless communication device of the vehicle and the wireless communication device of the mobile device.

Embodiments are based on the finding, that, after receiving an advertisement packet at a wireless communication device of a vehicle, a duty cycle of the scan for advertisement packets may be adjusted to increase the chances, that, as the mobile device approaches the vehicle, subsequent advertisement packets are properly received and a connection can be established between the vehicle and the mobile device. This may increase a likelihood of the mobile device being connected to the vehicle as the mobile device arrives at the vehicle, improving a use of the mobile device with the vehicle, e.g. as a means for opening the vehicle.

Embodiments of the present disclosure provide a wireless communication device for a vehicle. The wireless communication device comprises a transceiver module for communicating with a further wireless communication device. The wireless communication device comprises a control module configured to scan one or more wireless communication channels for advertisement packets. The wireless communication device is configured to receive an advertisement packet from the further wireless communication device. The wireless communication device is configured to adjust a duty cycle of the scan for the advertisement packets for a predefined time interval in response to receiving the advertisement packet. By adjusting the duty cycle of the scan for advertisement packets, the chances, that, as the further wireless communication device approaches the vehicle, subsequent advertisement packets are properly received and a connection can be established between the vehicle and the mobile device, are increased.

In embodiments, the control module may be configured to transmit a connection request to the further wireless communication device in response to receiving the advertisement packet. The duty cycle of the scan for the advertisement packets may be adjusted, if the further wireless communication device is deemed to not have received the connection request. For example, if no communication packets are received from the further wireless communication device, or if a received signal strength of the initial advertisement packet was too low, the duty cycle may be adjusted.

For example, the duty cycle of the scan may be increased in response to receiving the advertisement packet. By increasing the duty cycle, a likelihood of successfully receiving a subsequent advertisement packet may be increased.

In some embodiments, the duty cycle of the scan is adjusted based on a received signal strength of the advertisement packet. The received signal strength may be used to determine whether the further wireless communication device is likely to successfully receive a connection request transmitted in response to the advertisement packet.

For example, the duty cycle of the scan may be adjusted if a comparison between the received signal strength of the advertisement packet and a received signal strength of a previously received advertisement packet of the further wireless communication device indicates that the further wireless communication device is approaching the wireless communication device. This may improve an energy efficiency, as the duty cycle might not be adjusted if the further wireless communication device is moving away or in parallel to the vehicle.

Alternatively or additionally, the duty cycle of the scan may be adjusted if a comparison between the received signal strength of the advertisement packet and a received signal strength of a previously received advertisement packet of the further wireless communication device indicates that the further wireless communication device is at most a second pre-defined time interval away from reaching the wireless communication device. By estimating a time of arrival of the further wireless communication device at the wireless communication device, the duty cycle may be kept at a lower level if the further wireless communication device is still too far away, increasing an energy efficiency.

The adjustment of the duty cycle may be made dependent on the distance between the wireless communication devices. For example, the duty cycle of the scan may be adjusted if the received signal strength of the advertisement packet indicates that a distance between the wireless communication device and the further wireless communication device is lower than a distance threshold. Again, the duty cycle might (only) be adjusted if the further wireless communication device is sufficiently close the wireless communication device, increasing an energy efficiency.

For example, the pre-defined time interval may be between at least 5 seconds and/or at most 30 seconds long. This may suffice to scan for subsequent advertisement packets of the further wireless communication device.

In some embodiments, a transmission signal strength of the wireless communication device is lower than a transmission signal strength of the further wireless communication device. In other words, a link budget may be unbalanced between the wireless communication device and the further wireless communication device. This may be the reason for adjusting the duty cycle.

For example, the advertisement packet may be a directed advertisement packet. In other words, the advertisement packet may be specifically directed at the wireless communication device. This may be the case if the wireless communication device are previously paired. Accordingly, the further wireless communication device may be paired with the wireless communication device. By restricting the adjustment of the duty cycle to wireless communication devices that are known by the wireless communication device, not every advertisement packet may cause the adjustment of the duty cycle, increasing an energy efficiency.

In at least some embodiments, the transceiver module is configured to communicate with the further wireless communication device using a Bluetooth Low Energy (BLE) communication protocol. For example, the advertisement packet may be a Bluetooth Low Energy advertisement packet. BLE may be used for the communication between a mobile device (comprising the further wireless communication device) and the vehicle.

For example, the wireless communication device may be a central device according to the Bluetooth Low Energy communication protocol. The further wireless communication device may be a peripheral device according to the Bluetooth Low Energy communication protocol. In BLE, the central device may perform the connection establishment, while the peripheral devices advertise their presence.

Embodiments of the present disclosure provide a vehicle comprising the wireless communication device.

Embodiments of the present disclosure further provide a method for a wireless communication device of a vehicle. The method comprises scanning one or more wireless communication channels for advertisement packets. The method comprises receiving an advertisement packet from a further wireless communication device. The method comprises adjusting a duty cycle of the scan for the advertisement packets for a pre-defined time interval in response to receiving the advertisement packet. By adjusting the duty cycle of the scan for advertisement packets, the chances, that, as the further wireless communication device approaches the vehicle, subsequent advertisement packets are properly received and a connection can be established between the vehicle and the mobile device.

For example, the method may further comprise transmitting a connection request to the further wireless communication device in response to receiving the advertisement packet. The duty cycle of the scan for the advertisement packets may be adjusted, if the further wireless communication device is deemed to not have received the connection request. For example, if no communication packets are received from the further wireless communication device, or if a received signal strength of the initial advertisement packet was too low, the duty cycle may be adjusted.

Embodiments of the present disclosure provide a computer program having a program code for performing the method, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
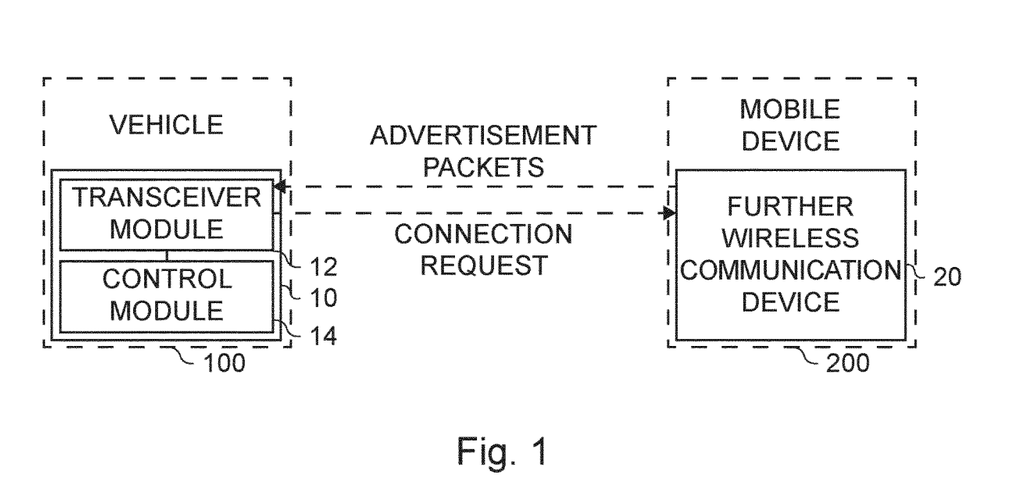
FIG. 1 shows a block diagram of an embodiment of a wireless communication device for a vehicle.
Figure 2:
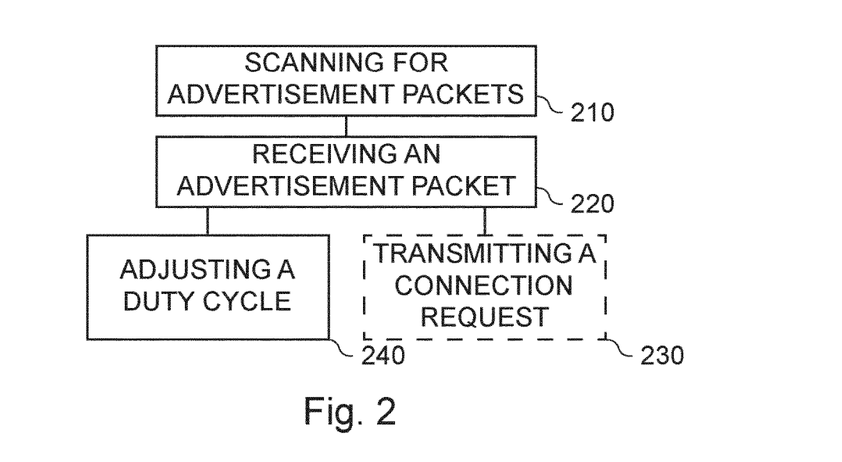
FIG. 2 shows a flow chart of an embodiment of a method for a wireless communication device.

FIG. 1 shows a block diagram of an embodiment of a wireless communication device 10 for a vehicle 100. The wireless communication device 10 comprises a transceiver module 12 for communicating with a further wireless communication device 20. The wireless communication device 10 further comprises a control module 14 that is coupled to the transceiver module 12. The control module 14 is configured to scan one or more wireless communication channels for advertisement packets. The control module 14 is further configured to receive an advertisement packet from the further wireless communication device 20. The control module 14 is further configured to adjust a duty cycle of the scan for the advertisement packets for a pre-defined time interval in response to receiving the advertisement packet. FIG. 1 further shows a vehicle 100 comprising the wireless communication device 10. FIG. 1 further shows a mobile device 200 comprising the further wireless communication device 20. In FIGS. 1 and 2, the wireless communication device 10 is part of the vehicle 100 and the further wireless communication device 20 is part of a mobile device 100. It should be evident to the person skilled in the art that the roles can be reversed, e.g. that the wireless communication device 10 is comprised by the mobile device 200 and the further wireless communication device is comprised by the vehicle 100. Whatever the distribution, FIG. 1 further shows a system comprising both the vehicle 100 and the mobile device 200.

FIG. 2 shows a flow chart of an embodiment of a corresponding method for a wireless communication device of a vehicle 100. The method comprises scanning 210 one or more wireless communication channels for advertisement packets. The method comprises receiving 220 an advertisement packet from a further wireless communication device 20. The method comprises adjusting 240 a duty cycle of the scan for the advertisement packets for a pre-defined time interval in response to receiving the advertisement packet. For example, the method may be executed by the wireless communication device 10 of the vehicle 100. Additional features of the wireless communication device 10 may therefore provide additional features for the corresponding method.

At least some embodiments relate to a wireless communication device and to a corresponding method and computer program. In general, the wireless communication device 10, and/or the further wireless communication device 20, may be wireless communication devices that are used by other devices, e.g. communication chipsets that are used by a mobile device or a vehicle to communicate via a wireless communication protocol, such as Bluetooth. For example, the wireless communication device 10, and/or the further wireless communication device 20, may be Bluetooth (LE) chipsets. In some embodiments, the wireless communication device 10, and/or the further wireless communication device 20, may be part of a wireless communication chipset, e.g. a combined WiFi/Bluetooth chipset.

As laid out above, at least some embodiments of the present disclosure relate to Bluetooth Low Energy communications, e.g. according to the Bluetooth standard 4.0 and later. In other words, the transceiver module 12 may be configured to communicate with the further wireless communication device 20 using a Bluetooth Low Energy communication protocol. The advertisement packet (and other, subsequent advertisement packets) may be a Bluetooth Low Energy advertisement packet.

In some wireless communication systems, such as in wireless communication via Bluetooth, communication is initiated via so-called "advertisement packets", which are packets which are (usually periodically) transmitted by a wireless communication device that wishes to be perceived by other wireless communication devices in its vicinity. When one of the other wireless communication devices receives such an advertisement packet, it may choose to establish (i.e. to initiate) a connection to the wireless communication device that has transmitted the advertisement packet. In the nomenclature of wireless communication, the wireless communication device may be denoted as "advertiser" wireless communication device and the other wireless communication device that initiates the connection as "initiator" wireless communication device of the connection. In Bluetooth Low Energy, the initiator wireless communication device is denoted as "central" wireless communication device, and the advertiser wireless communication device as "peripheral" wireless communication device. This principle also applies here. The wireless communication device 10 may be a central device according to the Bluetooth Low Energy communication protocol. The further wireless communication device 20 may be a peripheral device according to the Bluetooth Low Energy communication protocol.

In embodiments, the wireless communication device 10 of the vehicle 100 may be constrained by signal transmission regulations that apply to vehicles. For example, a transmission signal strength of the wireless communication device may be regulated to stay within a wireless communication power budget. Such restrictions might not apply to the further wireless communication device. Accordingly, a transmission signal strength of the wireless communication device 10 (e.g. of the transceiver module 12) may be lower than a transmission signal strength of the further wireless communication device 20. Therefore, an unbalance link budget may persist between the wireless communication device and the further wireless communication device.

The control module 14 is configured to scan one or more wireless communication channels for advertisement packets, e.g. using the transceiver module 12. In general, wireless communication between the wireless communication device and the further wireless communication device occur in one or more wireless communication channels. These channel may be part of a frequency band, e.g. a pre-defined frequency band that is generally used for the communication of that communication protocol. For example, the wireless communication between the wireless communication device 10 and the further wireless communication device may use the 2.4 GHz frequency band, i.e. the frequency band between 2.4 GHz and 2.5 GHz. This frequency band is a popular frequency band, as it is open for unlicensed communication between low-power wireless devices. Originally designated for ISM (Industrial, Scientific and Medical) purposes, it is now mostly known for the use in local wireless communication systems, such as Bluetooth (LE), WiFi, Zigbee, baby phones etc. Bluetooth LE, according to the Bluetooth core specification 4.0, uses 40 channels that are distributed over the frequency band between 2400 and 2480 MHz. Of these 40 channels, three channels, channels 37, 38 and 39, are used for advertisement packets, and the remaining 37 channels are used for data communication. Accordingly, the control module 14 may be configured to scan the one or more advertisement channels (i.e. channels 37, 38 and 39) of the Bluetooth LE communication protocol for advertisement packets.

When scanning for advertisement packets, in a normal operation, a duty cycle may be chosen that is only a fraction of 100%. For example, in the Android mobile operating system, three scan modes are distinguished—a low power scan mode having a duty cycle of 10%, a balanced scan model having a duty cycle of 40% and a low latency scan mode having a duty cycle of 100% (except for other communication preempting the scan). In general, 100% duty cycle means that the respective frequency band (or frequency bands) is/are scanned 100% of the time, 40% duty cycle means that the respective frequency band(s) is/are scanned 40% of the time, and 10% duty cycle means that the respective frequency band(s) is/are scanned 40% of the time. From that portion of the time, other events may be subtracted, such as received communication on other channels or the transmission of advertisement packets. Unfortunately, the higher the duty cycle, the more energy is consumed for scanning the respective channel(s). Therefore, especially in battery-powered operations, such as mobile devices or vehicles, a lower duty cycle may be chosen in normal operations. This is feasible, as advertisement packets are periodically repeated—in Bluetooth LE, advertisement packets are periodically repeated with a periodicity of between once every 20 ms up to once every 10.24 s. Therefore, even at low duty cycles, there is a high likelihood that the scanning occurs at the same time as an advertisement packet.

The control module 14 is configured to receive an advertisement packet from the further wireless communication device 20 (e.g. via the transceiver module 12). For example, the advertisement packet may be received via one of the one or more wireless communication channels (i.e. the advertisement data channels).

In Bluetooth, when an advertisement packet is received from a further wireless communication device that is previously paired with a wireless communication device receiving the advertisement packet, the wireless communication device receiving the advertisement packet may establish a connection with the further wireless communication device by transmitting a connection request to the further wireless communication device. Once the connection request is received by the further wireless communication device, the connection between the two wireless communication devices is established.

In general, in wireless communication systems, connections are logical constructs that are used to logically bundle wirelessly transmitted packets between two wireless communication devices. In embodiments, the connection between the wireless communication device 10 and the further wireless communication device 20 may be a logical connection that may be used to transmit both control data and payload data between the wireless communication device 10 and the further wireless communication device 20. For example, the connection may be a connection as defined in the Bluetooth LE specification.

Accordingly, the control module may be configured to transmit a connection request (CONNECT_REQ in Bluetooth LE) to the further wireless communication device 20 in response to receiving the advertisement packet, e.g. using one of the channels used for data communication. Correspondingly, the method may comprise transmitting 230 a connection request to the further wireless communication device 20 in response to receiving the advertisement packet. In some embodiments, the connection request may be transmitted before the duty cycle is adjusted. Alternatively, the connection request may be transmitted after the duty cycle is adjusted.

In some embodiments, the transmission of the connection request may be made conditional on whether the further wireless communication device is already in range of the wireless communication device 100, e.g. as estimated through a received signal strength of the advertisement packet. Alternatively or additionally, the adjustment of the duty cycle may be made conditional on whether the transmitted connection request is likely received by the further wireless communication device, e.g. based on the received signal strength or based on whether data packets are received from the further wireless communication device after transmitting the connection request. In other words, the duty cycle of the scan for the advertisement packets may be adjusted, if the further wireless communication device 20 is deemed to not have received the connection request. For example, the connection request may be deemed to be receive by the further wireless communication device if a received signal strength of the advertisement packet is above a threshold (indicating the further wireless communication device being in proximity of the wireless communication device) or if one or more data packets are received from the further wireless communication device over the newly-established connection.

The control module 14 is configured to adjust the duty cycle of the scan for the advertisement packets for a pre-defined time interval in response to receiving the advertisement packet. For example, the pre-defined time interval may be based on a periodicity of the transmission of the advertisement packet, e.g. to increase a likelihood that a subsequent advertisement packet is received from the wireless communication device. As the periodicity may depend on the wireless communication device being used, rule-of-thumb values may be chosen to cover a wide range of different mobile devices. Accordingly, the pre-defined time interval may be at least 5 seconds (or at least 6 seconds, at least 8 seconds, at least 10 seconds, at least 15 seconds) long. Additionally or alternatively, the pre-defined time interval may be at most 30 seconds (or at most 25 seconds, at most 20 seconds, at most 15 seconds long). In some embodiments, the pre-defined time interval may start with the reception of the advertisement packet, in some embodiments, the predefined time interval may start with the transmission of the connection request, and in some embodiments, the pre-defined time interval may start after a fixed or inherent time interval relative to either of the previous starting points.

In at least some embodiments, the duty cycle of the scan is increased in response to receiving the advertisement packet. For example, if, during normal operation, a 10% or 40% duty cycle is used by the wireless communication device, the duty cycle may be increased to surpass 10% or 40%, respectively. For example, the duty cycle may be increased to at least 50%, at least 60%, at least 70%, at least 80%, at least 90% or 100%. As indicated above, non-advertisement packets transmitted or received during the scanning period do not subtract from the duty cycle values, as the duty cycle is a value to be set at the transceiver (e.g. the transceiver module 12), and does not necessarily correspond to a fraction of time.

In at least some embodiments, the adjustment of the duty cycle may be made conditional on one or more factors. One factor may be whether the advertisement packet is actually relevant for the wireless communication device. For example, in a keyless access application, only advertisement packets from wireless communication devices being known to the vehicle may be of relevance, so that the adjustment might only be performed if the further wireless communication device is known to the wireless communication device. To distinguish advertisement packets from different sources, each advertisement packet may comprise a device identifier of the wireless communication device that has transmitted the advertisement packet, i.e. a unique identifier that may be used to uniquely identify the wireless communication device that has transmitted the advertisement packet. This device identifier may be used by the initiator wireless communication device to establish the connection. This device identifier may also be used to determine the identity of the further wireless communication device. Accordingly, if the advertisement packet is transmitted by a further wireless communication device that is paired with the wireless communication device, the duty cycle may be adjusted.

In some cases, the advertisement packet may also be a directed advertisement packet, e.g. an advertisement packet comprising an ADV_DIRECT_IND PDU (Protocol Data Unit) according to the Bluetooth Low Energy specification. A directed advertisement packet might not only comprise the device identifier of the wireless communication device transmitting the advertisement packet (AdvA), but also a device identifier of a wireless communication device that is the destination of the advertisement packet (InitA). In some embodiments, the duty cycle may (only) be adjusted, if the advertisement packet is a directed advertisement packet (that is directed at the wireless communication device 10).

Another factor may be the received signal strength (e.g. a received signal strength indicator, RSSI) of the advertisement packet—based on the received signal strength, a distance and/or a direction of travel of the wireless communication device relative to the wireless communication device may be estimated, and the duty cycle may be adjusted. In other words, the duty cycle of the scan may be adjusted based on a received signal strength of the advertisement packet. For example, the control module may be configured to estimate a direction of travel (e.g. towards the wireless communication device or away from the wireless communication device) of the further wireless communication device relative to the wireless communication device based on the received signal strength of the advertisement packet. Based on the direction of travel, the duty cycle may be adjusted (or not). For example, the direction of travel may be estimated based on a comparison of the received signal strength of the received advertisement packet and a previous received signal strength of a previously received advertisement packet. If the received signal strength increases, the further wireless communication device may be approaching the wireless communication device. In other words, the duty cycle of the scan may be adjusted if a comparison between the received signal strength of the advertisement packet and a received signal strength of a previously received advertisement packet of the further wireless communication device 20 indicates that the further wireless communication device 20 is approaching the wireless communication device.

Alternatively or additionally, the received signal strength may be used to estimate the time it takes the further wireless communication device to reach the wireless communication device, or, similarly, a distance between the further wireless communication device and the wireless communication device. For example, the duty cycle of the scan may be adjusted if a comparison between the received signal strength of the advertisement packet and a received signal strength of a previously received advertisement packet of the further wireless communication device 20 indicates that the further wireless communication device 20 is at most a second predefined time interval away from reaching the wireless communication device. In other words, the control module 14 may be configured to estimate a time of arrival of the further wireless communication device at the wireless communication device (e.g. at the vehicle) based on the comparison between the received signal strength of the advertisement packet and a received signal strength of a previously received advertisement packet. If the time of arrival is at most the pre-defined time interval, the duty cycle may be adjusted.

Alternatively or additionally, the duty cycle of the scan may be adjusted if the received signal strength of the advertisement packet indicates that a distance between the wireless communication device and the further wireless communication device 20 is lower than a distance threshold. For example, the control module may be configured to estimate the distance between the wireless communication device and the further wireless communication device based on the received signal strength, e.g. according to an estimation formula. Based on the estimated distance, the duty cycle may be adjusted (or not). For example, the distance threshold may be chosen such, that a connection establishment is successfully completed before the further wireless communication device reaches the wireless communication device/vehicle.

At least some embodiments may be used for vehicular access systems, e.g. keyless entry systems. Accordingly, the control module 14 may be configured to perform communication related to a keyless entry system via the established connection after the connection is established between the wireless communication device 10 and the further wireless communication device 20.

The transceiver module 12 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

For example, the vehicle 100 may be a land vehicle, a road vehicle, a car, an automobile, an off-road vehicle, a motor vehicle, a truck or a lorry. The mobile device 200 may be a mobile phone, such as a smartphone, a tablet computer or a wearable device, such as a smart watch or a fitness band.

More details and aspects of the wireless communication device 10 and/or the corresponding method are mentioned in connection with the proposed concept or one or more examples described above or below (e.g. FIG. 3). The wireless communication device 10 and/or the corresponding method may comprise one or more additional optional features corresponding to one or more aspects of the proposed concept or one or more examples described above or below.

Figure 3:
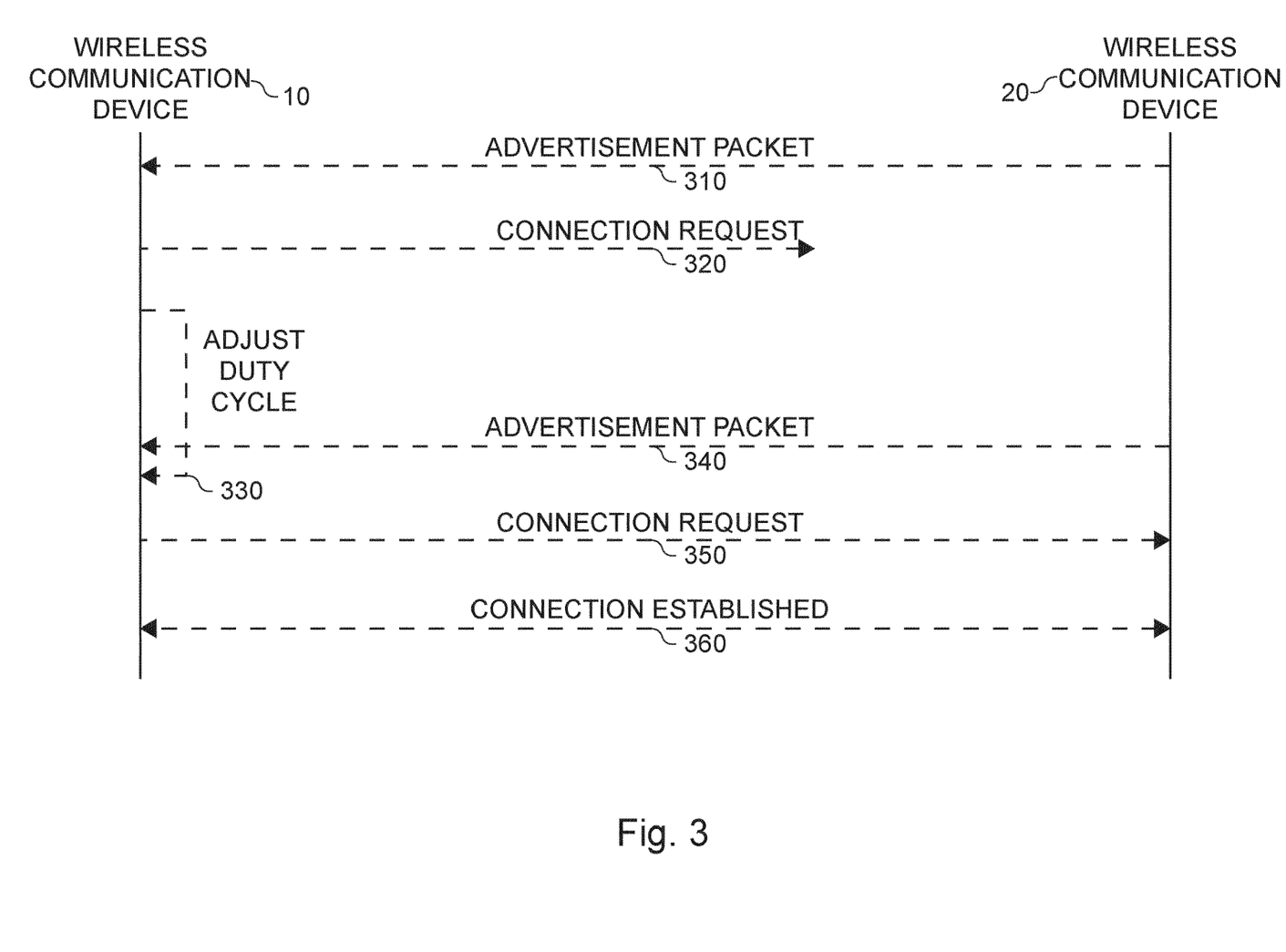
FIG. 3 shows a schematic diagram of packets being exchanged by two wireless communication devices.

FIG. 3 shows a schematic diagram of packets being exchanged by two wireless communication devices, e.g. the wireless communication devices 10 and 20 of FIG. 1. Wireless communication device 10 is configured to scan for advertisement packets from the further wireless communication device 20. In 310, wireless communication device receives an advertisement packet from the further wireless communication device 20. In 320, in response to the received 310 advertisement packet, the wireless communication device transmits a connection request 320 to the further wireless communication device 20, which is not received by wireless communication device 20 as the transmission signal strength/power is too low. In 330, the wireless communication device adjusts the duty cycle of the scan for advertisement packet. This may occur before or after transmission 320 of the connection request. In 340, the wireless communication device 10 receives a subsequent advertisement packet from the further wireless communication device 20 while the duty cycle is adjusted. In 350, the wireless communication device 10 transmits a subsequent connection request to the further wireless communication device 20 in response to the subsequent advertisement packet. This time, the connection request is successfully received by the further wireless communication device 20 and the connection between the wireless communication devices is established 360.

More details and aspects of the wireless communication devices 10; 20 are mentioned in connection with the proposed concept or one or more examples described above or below (e.g. 1 and 2). The wireless communication devices 10; 20 may comprise one or more additional optional features corresponding to one or more aspects of the proposed concept or one or more examples described above or below.

Embodiments of the present disclosure may relate to a reliable method for improving the coverage of Bluetooth low energy communication system in case of unbalanced link budgets.

The usage of Bluetooth low energy (BLE) has been increased in the resent years. In automotive domain, BLE is quite promising for different applications (e.g., keyless car access). The main purpose of using BLE is a fast discovery, which may require a large coverage area. Due to automotive requirements, the automotive BLE chips may have lower transmission power compared to consumer electronic chips. This may lead to an unbalanced link budget, which may affect the coverage and therefore discovery time.

Considering applications, in which a user is approaching the car, a fast discovery may be desired. Assuming that the automotive chip has the master role in the BLE connection (i.e. the "central device" role), the car transceiver (i.e. the wireless communication device 10 of FIG. 1) may scan (for advertisement packets) and the smart phone (SP, e.g. the further wireless communication device 20 of the mobile device 200) may advertise. The transmission power of the SP may be higher than the transmission power of the vehicle. When the advertising packet is received by the vehicle, the vehicle may send a connection request to the SP. As the user is still far away, the connection request might not be received by the SP. Due to smaller link budget, the connection might not be successfully established, as the peered device might not receive the connection request. In this case the vehicle chip may again switch to the default scanning mode (with a default scanning duty cycle) after a certain timeout. In order to save energy, vehicles might not be scanning with a high duty cycle permanently, so switching back to the normal scanning duty cycle may lead to a delay. Only when the user is in the coverage of the vehicular BLE chip (i.e. the wireless communication device 10), the connection request may be received by the SP. Embodiments may improve the discovery time in case of an unbalanced link budget, by avoiding the delay introduced above.

The main idea may be to limit the effect of unbalanced link budget by switching to an increased scanning duty cycle (e.g. a 100% scanning duty cycle) when an advertising packet of a known device is detected, assuming the other device (peripheral) is approaching the central device. Accordingly, after the connection request is sent by the vehicle and no response is sent from the SP, the vehicle might not switch back to normal scanning duty cycle but to an increased (e.g. 100% scanning duty cycle) for a predefined time interval. This may avoid the delay due to switching to normal scanning duty cycle. Embodiments may, for example, be used for smartphone keyless car access systems, as they may require a fast discovery in order to unlock the car at the right time when the user arrives at it.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

REFERENCE SIGNS

10 Wireless communication device
12 Transceiver module
14 Control module
20 Further wireless communication device
100 Vehicle
200 Mobile device
210 Scanning for advertisement packets
220 Receiving an advertisement packet
230 Transmitting a connection request
240 Adjusting a duty cycle
310 Receiving an advertisement packet
320 Transmitting a connection request
330 Adjusting a duty cycle
340 Receiving an advertisement packet
350 Transmitting a connection request
360 Connection is established

What is claimed is:

1. A wireless communication device for a vehicle, the wireless communication device for the vehicle comprising:
a transceiver module for communicating with a further wireless communication device; and
a control module configured to:
scan one or more wireless communication channels for advertisement packets, the scan having a duty cycle,
receive an advertisement packet from the further wireless communication device, and
adjust the duty cycle of the scan for the advertisement packets for a pre-defined time interval in response to receiving the advertisement packet, wherein the duty cycle of the scan is increased from a first lower duty cycle percentage to a second larger duty cycle percentage, wherein the duty cycle of the scan for advertisement packets is adjusted based on a received signal strength of the advertisement packet.

2. The wireless communication device according to claim 1, wherein the control module is configured to transmit a connection request to the further wireless communication device in response to receiving the advertisement packet, wherein the duty cycle of the scan for the advertisement packets is adjusted, if the further wireless communication device is deemed to not have received the connection request.

3. The wireless communication device according to claim 1, wherein the duty cycle of the scan is adjusted if a comparison between the received signal strength of the advertisement packet and a received signal strength of a previously received advertisement packet of the further wireless communication device indicates that the further wireless communication device is approaching the wireless communication device.

4. The wireless communication device according to claim 1, wherein the duty cycle of the scan is adjusted if a comparison between the received signal strength of the advertisement packet and a received signal strength of a previously received advertisement packet of the further wireless communication device indicates that the further wireless communication device is at most a second pre-defined time interval away from reaching the wireless communication device.

5. The wireless communication device according to claim 1, wherein the pre-defined time interval is between at least 5 seconds and/or at most 30 seconds long.

6. The wireless communication device according to claim 1, wherein a transmission signal strength of the wireless communication device is lower than a transmission signal strength of the further wireless communication device.

7. The wireless communication device according to claim 1, wherein the advertisement packet is a directed advertisement packet, and/or wherein the further wireless communication device is paired with the wireless communication device.

8. The wireless communication device according to claim 1, wherein the transceiver module is configured to communicate with the further wireless communication device using a Bluetooth Low Energy communication protocol, and/or wherein the advertisement packet is a Bluetooth Low Energy advertisement packet.

9. The wireless communication device according to claim 8, wherein the wireless communication device is a central device according to the Bluetooth Low Energy communication protocol, and wherein the further wireless communication device is a peripheral device according to the Bluetooth Low Energy communication protocol.

10. A vehicle comprising the wireless communication device according to claim 1.

11. The wireless communication device according to claim 1, wherein the duty cycle of the scan is adjusted if the received signal strength of the advertisement packet indicates that a distance between the wireless communication device and the further wireless communication device is lower than a distance threshold.

12. A method for a wireless communication device of a vehicle, the method comprising:
scanning one or more wireless communication channels for advertisement packets, the scan having a duty cycle;
receiving an advertisement packet from a further wireless communication device; and
adjusting the duty cycle of the scan for the advertisement packets for a pre-defined time interval in response to receiving the advertisement packet, wherein the duty cycle of the scan is increased from a first lower duty cycle percentage to a second larger duty cycle percentage, wherein the duty cycle of the scan for advertisement packets is adjusted based on a received signal strength of the advertisement packet.

13. The method according to claim 12, further comprising transmitting a connection request to the further wireless communication device in response to receiving the advertisement packet, wherein the duty cycle of the scan for the advertisement packets is adjusted, if the further wireless communication device is deemed to not have received the connection request.

14. A non-transitory, computer-readable medium having a program code for performing the method of claim 12 when the computer program is executed on a computer, a processor, or a programmable hardware component.

* * * * *